No. 771,445. PATENTED OCT. 4, 1904.
O. L. PICKARD.
RIM FOR RUBBER TIRED WHEELS.
APPLICATION FILED DEC. 30, 1903.
NO MODEL.

Witnesses:
Inventor:
O. L. Pickard
By L. B. Courtland
Atty

No. 771,445.

Patented October 4, 1904.

UNITED STATES PATENT OFFICE.

REISSUED

ORSON L. PICKARD, OF CHICAGO, ILLINOIS.

RIM FOR RUBBER-TIRED WHEELS.

SPECIFICATION forming part of Letters Patent No. 771,445, dated October 4, 1904.

Application filed December 30, 1903. Serial No. 187,194. (No model.)

*To all whom it may concern:*

Be it known that I, ORSON L. PICKARD, a citizen of the United States, residing at Chicago, in the county of Cook and State of Illinois, have invented new and useful Improvements in Rims for Rubber-Tired Wheels, of which the following is a specification.

This invention relates to rubber-tired vehicle-wheels, and more especially in connection with bicycles and automobiles, and has for its object to provide means for readily and conveniently securing the rubber tire in place on the rims without the use of cement or other adhesive composition.

Figure 1:
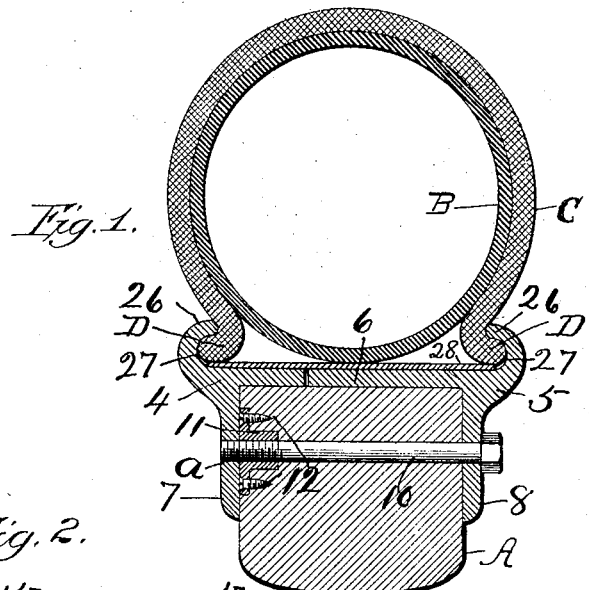
Figure 2:
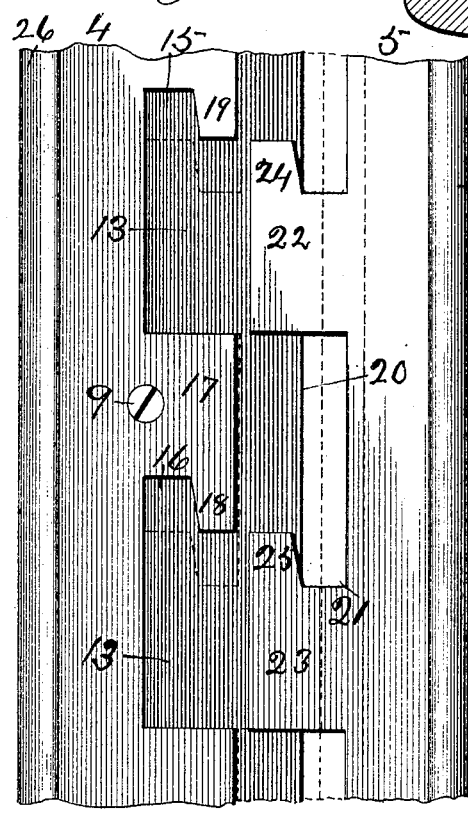
Figure 3:
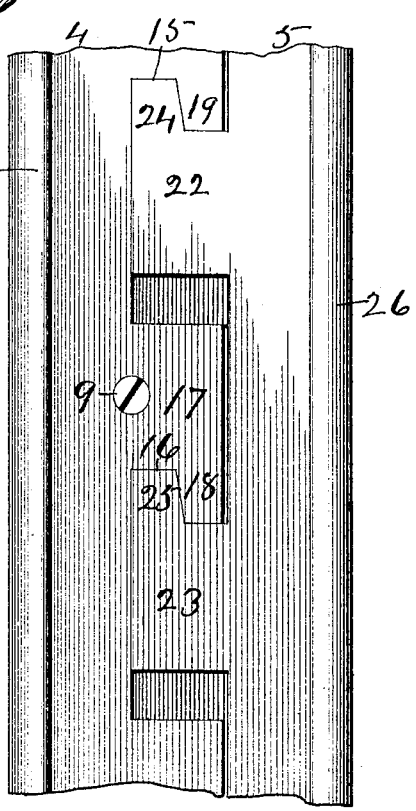

In the drawings, Figure 1 is a transverse section of the felly, rim, and tire parts embodying the improved features. Fig. 2 is a plan of a sectional rim, the two parts being disengaged; and Fig. 3 is a similar view showing the rim-sections locked together.

A represents the felly, which may be of the usual construction; B, the inner air-tube; C, the outer sheathing tube or tire; 4, the rigid section of the rim, and 5 the removable section. The rim is divided circumferentially through the body into the two sections or parts 4 and 5 and consists of the body 6 and the side flanges 7 and 8. The rigid section 4 is secured to the felly by a number of screws 9 inserted through the body part and disposed at intervals, the two sections of the rim being further secured to the felly by a number of clamping-bolts 10 inserted through the removable part of the rim and having a threaded engagement with the rigid part, as at *a*. A socket-plate 11 is recessed in the felly on one side and fastened in place by screws 12, Fig. 1. The bolts 10 pass through and have a threaded engagement with the socket-plates, which affords additional holding-ground in properly securing these parts together against displacement.

The inner edge of the rigid rim part 4 is cut out at two different points in providing entering companion recesses 13, having locking-recesses 15 and 16 opening thereinto from the ends, as best shown in Fig. 2. This cutting-out feature provides an integral plate 17, having a locking-tongue 18 and located intermediate with reference to the recesses 13. The outer wall inclosing recess 15 forms a locking-tongue 19. The inner edge of removable rim part 5 is cut out to form an entering-recess 20 and a locking-recess 21, corresponding to recesses 13 of the other rim part. The rim edge of the removable part is provided with companion plates 22 and 23, corresponding to plate 17 and is provided with locking-tongues 24 and 25, adapted to engage the recesses 15 and 16, respectively, in locking the rim-sections securely together against lateral separation, as shown in Fig. 3. The respective plates 17, 22, and 23 are shown in position, Fig. 2, to enter the recesses in the separable rim-sections, and when so joined the loose rim part is turned to bring the locking-tongues into engagement, Fig. 3, with their locking-recesses, which brings the holes for the bolts 10 into line. The engaging edges of the tongues are beveled and come together with a wedging drawing action.

The side flanges 7 and 8 of the rim parts are curved inward around their upper sides and terminate in the overlapping hook edges 26, forming annular recesses 27 for a close-fitting engagement of the outwardly-turned edges D of the tire C in providing an interlock, as shown in Fig. 1.

A thin ring 28 is loosely interposed between the periphery of the rim and the air-tube and provides a smooth bearing-surface for the latter.

It will be readily seen by this arrangement with what facility the different parts may be assembled or separated and the pneumatic tube or tire so firmly secured in place that accidental displacement is hardly a possibility.

In separating the parts the bolts 10 are turned back just far enough to be free from a threaded engagement with the rim-section on that side and yet have a threaded hold in socket-plate 11 and prevent the bolts from coming out. It will also be understood how rigidly the sections of the rim may be drawn together by the clamping-bolts in firmly drawing the edges of the tire into an interlocking engagement.

Having thus described my invention, what

I claim, and desire to secure by Letters Patent, is—

1. In combination with the rim and rubber tire of a wheel, a sectional metal plate for clasping said tire and transverse screws for holding said plate to said tire and drawing the two sections of the said plate together, the said sections being provided with recesses and projecting parts which interlock in the direction of rotation substantially as set forth.

2. In combination with the rim and rubber tire of a wheel, a plate in two sections adapted and arranged to clasp the said tire, means for fastening said plate to said rim and clasping its sections together and a plate 28 interposed between said sectional plate and said rubber tire substantially as set forth.

3. In combination with the rubber tire of a wheel, a circumferentially-divided plate adapted to clasp the said tire, a rim overlapped at the sides by parts of the sections of the said plate, screws which pass through said overlapping parts of said plate-sections and also through the intervening rim, the said parts of the plate being screw-tapped to engage them, and screw-threaded sockets which are countersunk in the said rim to register with the screw-tapped holes in said plate and receive and engage the said screws substantially as set forth.

In testimony whereof I have signed my name to this specification in the presence of two subscribing witnesses.

ORSON L. PICKARD.

Witnesses:
G. E. CHURCH,
L. B. COUPLAND.